United States Patent
Mori et al.

(10) Patent No.: US 10,213,825 B2
(45) Date of Patent: Feb. 26, 2019

(54) METHOD FOR MANUFACTURING CYLINDRICAL RING MEMBER, BEARING, CLUTCH, VEHICLE, AND MACHINE

(71) Applicant: NSK LTD., Tokyo (JP)

(72) Inventors: Kouhei Mori, Fujisawa (JP); Shunichi Karasawa, Fukuroi (JP); Mizuki Watanabe, Fujisawa (JP); Kazuto Kobayashi, Fujisawa (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 15/760,315

(22) PCT Filed: Jul. 18, 2017

(86) PCT No.: PCT/JP2017/025975
§ 371 (c)(1),
(2) Date: Mar. 15, 2018

(87) PCT Pub. No.: WO2018/016488
PCT Pub. Date: Jan. 25, 2018

(65) Prior Publication Data
US 2018/0257131 A1    Sep. 13, 2018

(30) Foreign Application Priority Data
Jul. 19, 2016 (JP) ................. 2016-141062

(51) Int. Cl.
*B21K 1/04* (2006.01)
*F16C 19/06* (2006.01)
(Continued)

(52) U.S. Cl.
CPC .............. *B21K 1/04* (2013.01); *B21K 21/08* (2013.01); *F16C 19/06* (2013.01); *F16C 33/64* (2013.01);
(Continued)

(58) Field of Classification Search
CPC .......... B21D 53/10; B21K 1/04; B21K 21/08; B21K 21/12; B23P 15/003;
(Continued)

(56) References Cited

FOREIGN PATENT DOCUMENTS

| JP | 2000-176557 A | 6/2000 |
|---|---|---|
| JP | 2002-243021 A | 8/2002 |

(Continued)

OTHER PUBLICATIONS

Search Report dated Sep. 26, 2017, issued by the International Searching Authority in counterpart International Patent Application No. PCT/JP2017/025975 (PCT/ISA/210).

(Continued)

*Primary Examiner* — Matthew P Travers
(74) *Attorney, Agent, or Firm* — Sughrue Mion, PLLC

(57) ABSTRACT

A method of manufacturing a cylindrical ring member includes a step of forming a metal intermediate material having a cylindrical portion and a chamfering step by cold forging in which a normal chamfer portion is formed on an axial end peripheral edge of the cylindrical portion by pressing a radial end portion of an axial end surface of the cylindrical portion against an annular chamfering surface provided in a mold configuring a mold device. A chamfering step is performed by cold forging in a state where a preliminary chamfer portion, of which a width dimension in a radial direction is larger than a width dimension of the normal chamfer portion in a radial direction, is formed on the axial end peripheral edge of the cylindrical portion.

10 Claims, 11 Drawing Sheets

(51) Int. Cl.
*B21K 21/08* (2006.01)
*F16C 33/64* (2006.01)
*B21J 5/02* (2006.01)
*B21J 13/02* (2006.01)
*B23P 15/00* (2006.01)
*B21K 21/12* (2006.01)
*B21J 5/00* (2006.01)

(52) U.S. Cl.
CPC ................ *B21J 5/008* (2013.01); *B21J 5/025* (2013.01); *B21J 13/02* (2013.01); *B21K 21/12* (2013.01); *B23P 15/003* (2013.01); *F16C 2220/46* (2013.01)

(58) Field of Classification Search
CPC .. F16C 2220/46; F16C 2220/48; F16C 33/64; F16C 19/06; B21J 1/04; B21J 5/008; B21J 5/022; B21J 5/025; B21J 5/12; B21J 13/02
See application file for complete search history.

(56) References Cited

FOREIGN PATENT DOCUMENTS

JP 2009-279611 A 12/2009
JP 2012166229 A * 9/2012 .............. F16C 33/64

OTHER PUBLICATIONS

Written Opinion dated Sep. 26, 2017, issued by the International Searching Authority in counterpart International Patent Application No. PCT/JP2017/025975 (PCT/ISA/237).

* cited by examiner

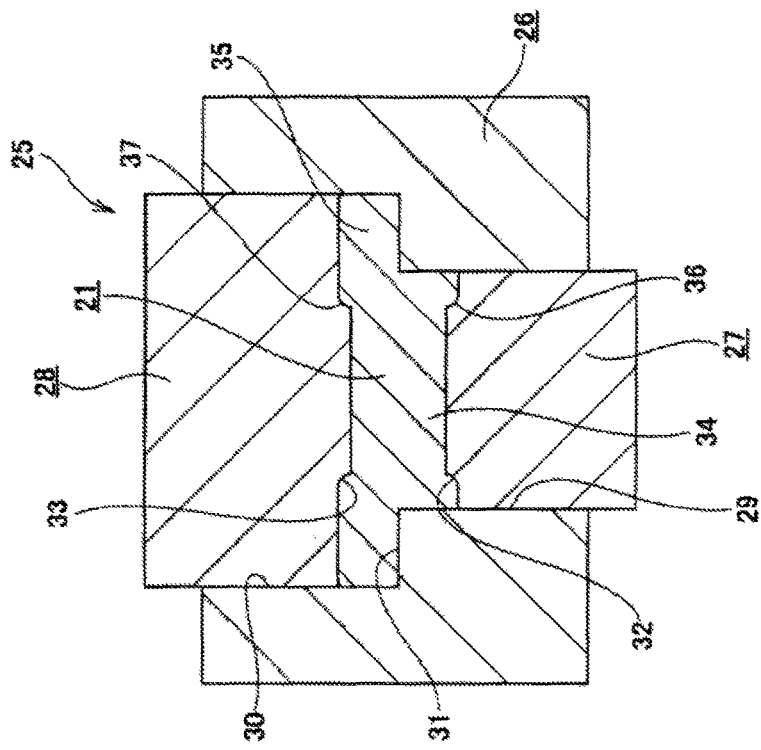
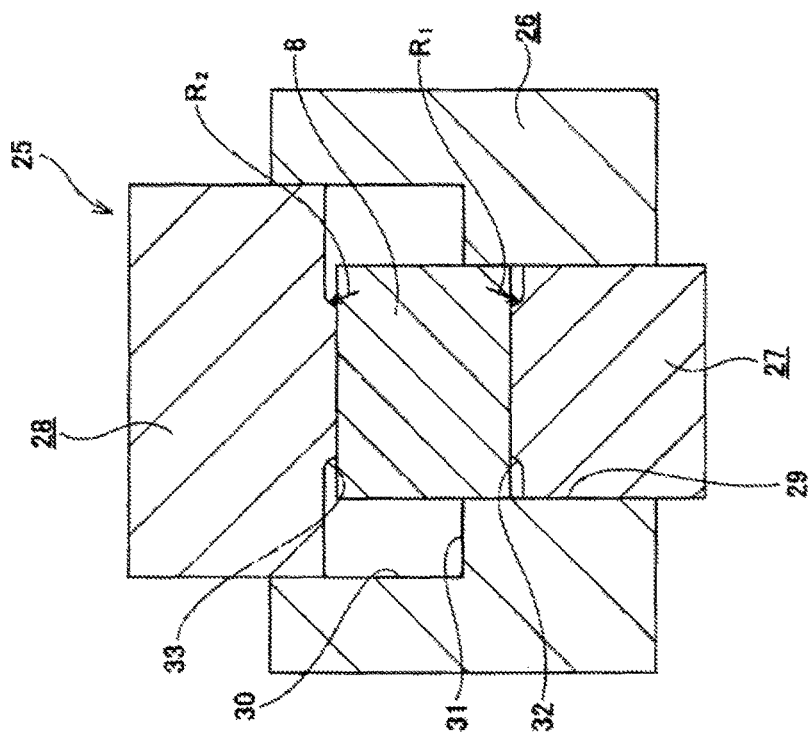

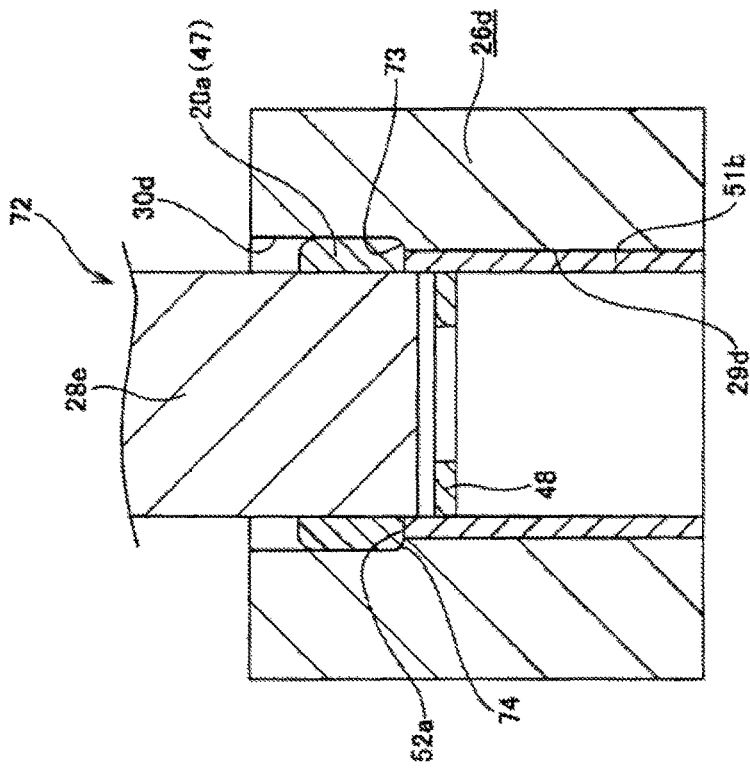
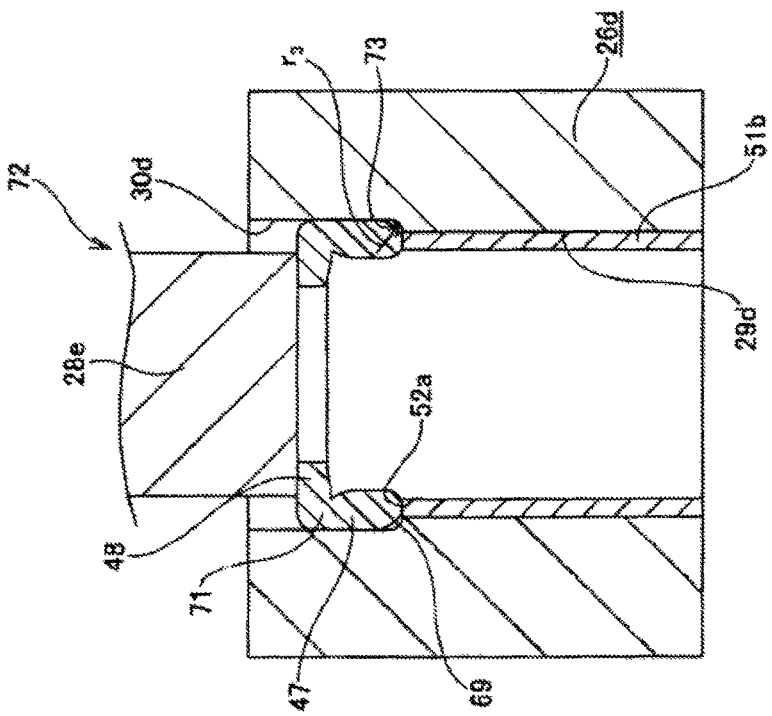

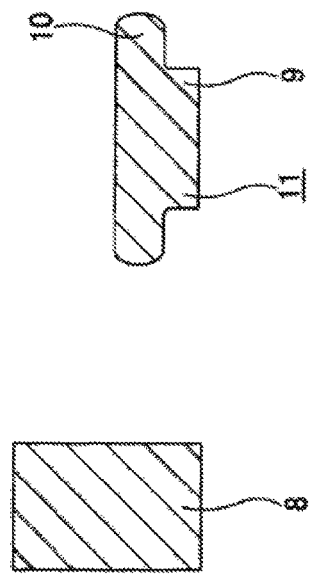
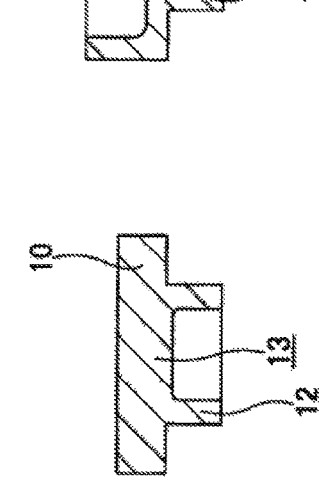
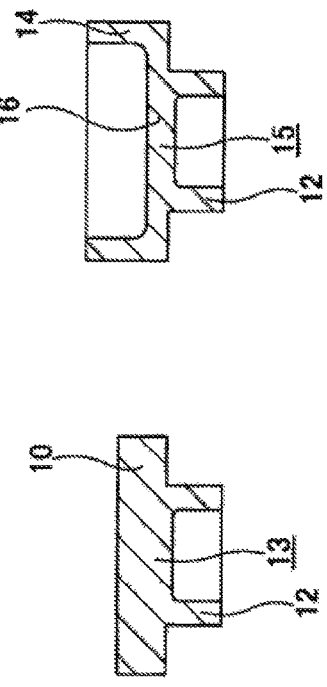
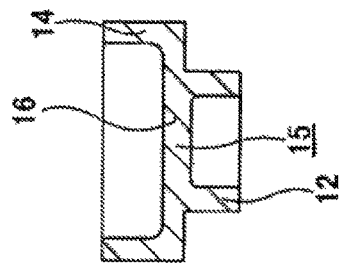
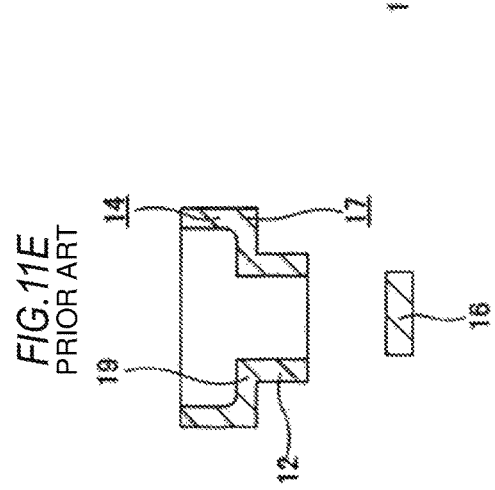
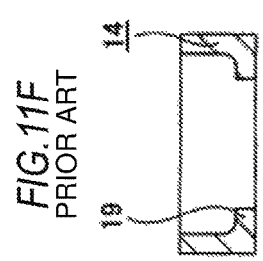
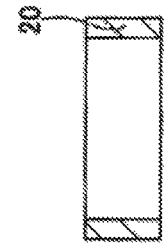
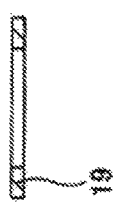

METHOD FOR MANUFACTURING CYLINDRICAL RING MEMBER, BEARING, CLUTCH, VEHICLE, AND MACHINE

TECHNICAL FIELD

The present invention relates to improvements on methods of manufacturing a cylindrical ring member, a bearing, a clutch, a vehicle, and a machine. The cylindrical ring member, for example, serves as a material for manufacturing an inner ring and an outer ring configuring a radial rolling bearing, a one-way clutch, and the like.

RELATED ART

A radial ball bearing 1 as shown in FIG. 10 is incorporated in a rotation support portion of each of various rotation machines. The radial ball bearing 1 is a single row deep groove type. The radial ball bearing 1 comprises an outer ring 2 and an inner ring 3 arranged concentrically with each other, and a plurality of balls 4, 4 disposed between the outer ring 2 and the inner ring 3.

A deep groove type outer ring raceway 5 is formed on an axial intermediate portion of an inner peripheral surface of the outer ring 2 over a whole periphery. A deep groove type inner ring raceway 6 is formed on an axial intermediate portion of an outer peripheral surface of the inner ring 3 over a whole periphery. Each of the balls 4, 4 is rotationally arranged between the outer ring raceway 5 and the inner ring raceway 6 in a state where each ball is held by a retainer 7. With this configuration, the outer ring 2 and the inner ring 3 are relatively rotatable. Chamfer portions 75, 75 each having an arc or linear sectional shape are provided on inner and outer peripheral edge portions of axial both end surfaces of the outer ring 2 and the inner ring 3 configuring the radial ball bearing 1.

As a method of manufacturing a bearing ring such as the outer ring 2, the inner ring 3, and the like configuring the radial ball bearing 1 as described above at low cost, a method adopting steps as shown in FIG. 11 has been known. In this method, upsetting for crushing a billet 8 in an axial direction is performed in a state where an outer diameter of a lower end portion of the billet 8 shown in FIG. 11A is restrained. Thereby, as shown in FIG. 11B, a first intermediate material 11 comprising a small-diameter portion 9 and a large-diameter portion 10 is formed.

Then, the small-diameter portion 9 is subjected to forward extrusion and processed into a small-diameter cylindrical portion 12, so that a second intermediate material 13 shown in FIG. 11C is obtained. Then, the large-diameter portion 10 is subjected to backward extrusion and processed into a large-diameter cylindrical portion 14, so that a third intermediate material 15 shown in FIG. 11D is obtained. Such processing of FIG. 11A to FIG. 11D is performed by cold forging.

Then, the third intermediate material 15 is subjected to punching to punch out a bottom plate portion 16 of the third intermediate material 15, so as to obtain a fourth intermediate material 17 shown in FIG. 11E. Then, as shown in FIG. 11F, the fourth intermediate material 17 is subjected to punching to punch out a portion corresponding to the small-diameter cylindrical portion 12 from the fourth intermediate material 17, so as to obtain a small-diameter cylindrical ring member 18. Finally, as shown in FIG. 11G, an inward flange 19 is punched out from a portion corresponding to the large-diameter cylindrical portion 14, so as to obtain a large-diameter cylindrical ring member 20.

The small-diameter cylindrical ring member 18 and the large-diameter cylindrical ring member 20 obtained by the steps as described above are materials for the outer ring 2 or the inner ring 3. In this state, inner diameter dimensions, outer diameter dimensions, axial dimensions, and shapes of inner and outer peripheral surfaces are not dimensions and shapes of the outer ring 2 and the inner ring 3. Therefore, the small-diameter cylindrical ring member 18 and the large-diameter cylindrical ring member 20 are subjected to appropriate post-processing such as rolling, cutting, grinding, and the like and appropriate heat treatment, so as to obtain the outer ring 2 and the inner ring 3.

Further, in the case of manufacturing the outer ring 2 and the inner ring 3 from the small-diameter cylindrical ring member 18 and large-diameter cylindrical ring member 20 as described above, it is preferable to reduce a processing allowance (machining allowance) in post-processing in terms of suppressing the processing cost. In view of such circumstances, for example, in Patent Document 1, there has been described a method for forming a R chamfer portion having an arc sectional shape on a portion (an axial end peripheral edge) corresponding to chamfer portions 75, 75 of the outer ring 2 and the inner ring 3 after completion when manufacturing an intermediate material by cold forging.

In the case of the conventional method described in Patent Document 1, each rounding-chamfer portion is formed on an axial end peripheral edge (an inner peripheral edge or an outer peripheral edge) of the small-diameter cylindrical portion 12 or the large-diameter cylindrical portion 14 by pressing a radial end portion of an axial end surface of the small-diameter cylindrical portion 12 or the large-diameter cylindrical portion 14 against an annular rounding-chamfering surface provided on a mold. That is, in the case of the conventional method described in Patent Document 1, there is a possibility that a peripheral edge, which is a sharp end edge of the axial end surface, of the small-diameter cylindrical portion 12 or the large-diameter cylindrical portion 14 is initially brought into contact with (pressed against) the rounding-chamfering surface.

In this state, when the axial end surface of the small-diameter cylindrical portion 12 or the large-diameter cylindrical portion 14 is pressed against the mold, a metal material configuring the intermediate material may not flow smoothly in the vicinity of the axial end peripheral edge of the small-diameter cylindrical portion 12 or the large-diameter cylindrical portion 14, and there is a possibility that it becomes difficult to stabilize a shape of the rounding-chamfer portion (it is difficult to ensure shape accuracy).

In a case where a sleeve as a movable member is arranged on an inner diameter side or an outer diameter side of the mold including the rounding-chamfering surface in order to make it easier to take out the intermediate material from a mold device after forming the rounding-chamfer portion, there is a possibility that a metal material enters between peripheral surfaces of the mold and the sleeve and a burr is formed thereon.

CITATION LIST

Patent Document

Patent Document 1: JP-A-2009-279611

SUMMARY OF THE INVENTION

Problems to be Solved

In view of the above-described circumstances, the present invention has been made to realize a manufacturing method capable of improving shape accuracy of a chamfer portion formed on an axial end peripheral edge of a cylindrical portion.

Means for Solving the Problem

A first aspect of a method of manufacturing a cylindrical ring member includes a step of forming an intermediate material (including an intermediate material consisting of a cylindrical portion) having a cylindrical portion, for example, by subjecting a metal columnar material to plastic processing, and a chamfering step by cold forging.

Specifically, a normal chamfer portion is formed on the axial end peripheral edge of the cylindrical portion by pressing a radial end portion of an axial end surface of the cylindrical portion against an annular chamfering surface provided on a mold configuring a mold device.

In the first aspect, in a state where a preliminary chamfer portion in which a width dimension thereof in a radial direction is larger than a width dimension of the normal chamfer portion in a radial direction is formed on the axial end peripheral edge of the cylindrical portion, a chamfering step is performed by cold forging.

In a second aspect, the mold device may further include a second mold having a ring-shaped holding surface arranged coaxially with the chamfering surface and adjacent thereto in the radial direction.

The chamfering step by cold forging may be performed by pressing the radial end portion of the axial end surface of the cylindrical portion against the chamfering surface in an axial direction and pressing a portion, adjacent to the radial end portion in the radial direction, of the axial end surface against the holding surface in the axial direction.

When performing the chamfering step by cold forging, the holding surface may be initially brought into contact with a radial intermediate portion (a portion is distant in the radial direction from the preliminary chamfer portion) of the axial end surface of the cylindrical portion.

In a third aspect, when performing the chamfering step by cold forging, the holding surface may be initially brought into contact with the radial intermediate portion of the axial end surface of the cylindrical portion by arranging the holding surface closer to the axial end surface of the cylindrical portion than the chamfering surface of the mold in the axial direction.

In a fourth aspect, at a final stage of the chamfering step by cold forging, vertical positions of the holding surface and an axial end edge of the chamfering surface of the mold may coincide with each other.

In a fifth aspect, processing for forming the preliminary chamfer portion and processing for forming other portions to be performed in the process of obtaining the intermediate material may be performed by cold forging at the same time (at one step).

The normal chamfer portion and the preliminary chamfer portion may be rounding-chamfer portions each having an arc sectional shape. A radius of curvature of the preliminary chamfer portion may be larger than a radius of curvature of the normal chamfer portion.

Effect of Invention

According to the first aspect, the shape accuracy of the chamfer portion (normal chamfer portion) formed on the axial end peripheral edge of the cylindrical portion can be improved.

That is, in a state where the preliminary chamfer portion in which the width dimension thereof in the radial direction is larger than the width dimension of the normal chamfer portion in the radial direction is formed on the axial end peripheral edge of the cylindrical portion, the normal chamfer portion is formed on the axial end peripheral edge of the cylindrical portion by pressing the radial end of the axial end surface of the cylindrical portion against the chamfering surface. Therefore, as in the conventional method described in the above-described Patent Document 1, it can be avoided that the sharp end edge is initially brought into contact with the chamfering surface. As a result, when forming the chamfer portion by cold forging, the metal material configuring the intermediate material can smoothly flow on the axial end peripheral edge of the cylindrical portion, and the shape accuracy of the chamfer portion formed on the axial end peripheral edge of cylindrical portion can be improved.

According to the second aspect, when performing the chamfering step by cold forging, the holding surface is initially brought into contact with the radial intermediate portion of the axial end surface of the cylindrical portion. Therefore, it is difficult to occur that the metal material enters between peripheral surfaces of a mold including the chamfering surface and a second mold including the holding surface to form a burr.

According to the fifth aspect, if the processing for forming the preliminary chamfer portion and the processing for forming other portions are performed at the same time, it is possible to suppress an increase in manufacturing cost for forming the preliminary chamfer portion.

BRIEF DESCRIPTION OF DRAWINGS

FIG. 1A and FIG. 1B are sectional views showing a first step of a first example according to an embodiment of the present invention.

FIG. 6A shows a halfway stage of a fourth step related to a comparative example, and FIG. 6B shows a final stage thereof.

FIGS. 9A and 9B are sectional views showing a third step the second example according to the embodiment of the present invention.

FIGS. 11A to 11G are sectional views showing one example of a conventional method for forming a pair of cylindrical ring members with different diameter dimensions from a columnar billet shown in the order of steps.

DESCRIPTION OF EMBODIMENTS

First Example

Hereinafter, a first example according to an embodiment of the present invention will be described with reference to FIGS. 1 to 6.

Figure 2B:
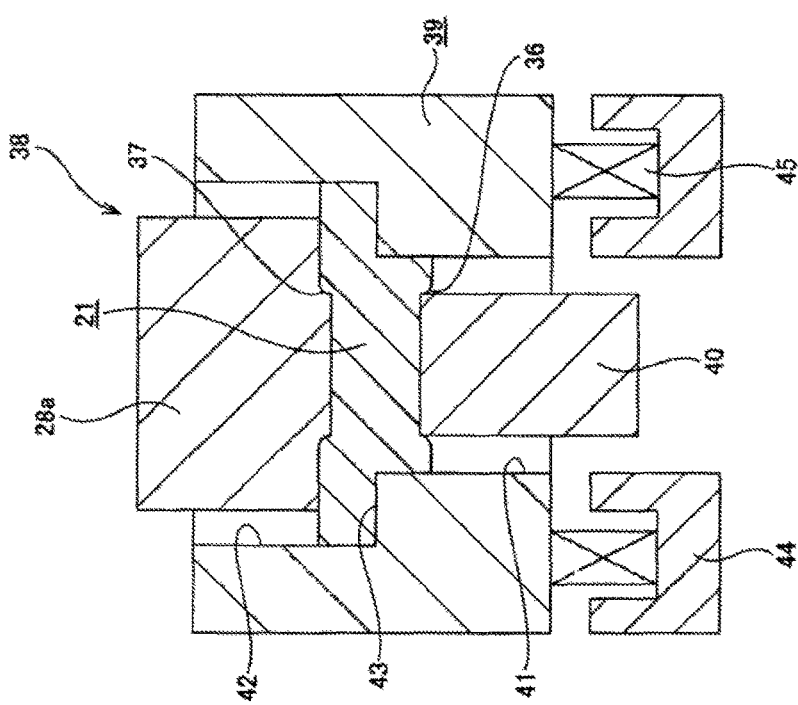
Figure 3:
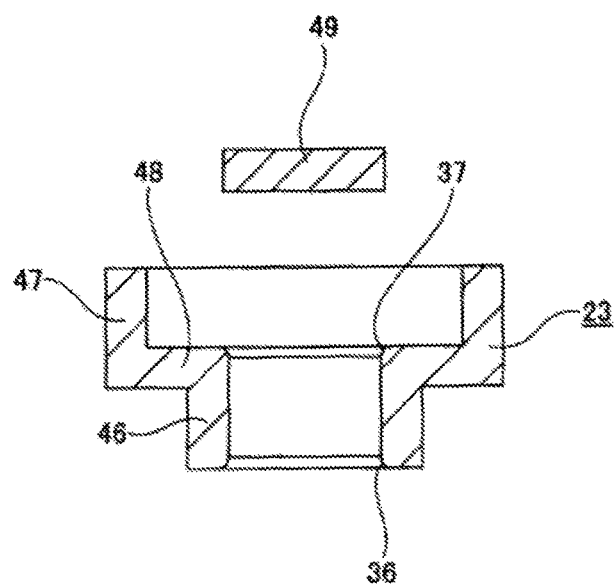
FIG. 3 is a sectional view showing a third step of the first example according to the embodiment of the present invention.

In the case of this example, in a first step, a columnar billet 8 as shown in FIG. 1A is made into a first intermediate material 21 as shown in FIG. 1B. Then, in a second step, the first intermediate material 21 is made into a second intermediate material 22 as shown in FIG. 2B. Then, in a third step, the second intermediate material 22 is made into a third intermediate material 23 as shown in FIG. 3. Then, in a fourth step, the third intermediate material 23 is made into a fourth intermediate material 24 as shown in FIG. 4B. Further, in a subsequent step, the fourth intermediate material 24 is subjected to punching as shown in, for example, FIG. 11F to FIG. 11G described above, so as to obtain a small-diameter cylindrical ring member 18 and a large-diameter cylindrical ring member 20 each having a cylindrical shape and having different diameters.

Therefore, the first step to the fourth step of the steps will be specifically described below. In the following description of this example, a vertical direction refers to a vertical direction in FIGS. 1 to 6. However, the vertical direction in FIGS. 1 to 6 does not necessarily coincide with a vertical direction during processing.

[First Step]

In the first step, the columnar billet 8 is subjected to upsetting by cold forging using a mold device 25 as shown in FIG. 1, so as to obtain the first intermediate material 21. The mold device 25 includes a die 26, a die pin 27, and a punch 28.

The die 26 has an inner peripheral surface with a stepped cylindrical shape. That is, the inner peripheral surface of the die 26 with a stepped cylindrical shape has a small-diameter cylindrical surface portion 29 on a lower side and a large-diameter cylindrical surface portion 30 on an upper side arranged coaxially with each other, and an annular step portion 31 orthogonal to a central axis of the small-diameter cylindrical surface portion 29 and the large-diameter cylindrical surface portion 30. The small-diameter cylindrical surface portion 29 and the large-diameter cylindrical surface portion 30 are connected by the step portion 31. An inner diameter of the small-diameter cylindrical surface portion 29 is substantially equal to an outer diameter of the billet 8 (a dimension of the inner diameter allows the billet 8 to be internally fitted without radial rattling).

The die pin 27 has a columnar shape. The die pin 27 is internally fitted to an intermediate portion from a lower end portion of the small-diameter cylindrical surface portion 29 of a center hole of the die 26 without radial rattling. A radial central portion of an upper end surface of the die pin 27 is a circular flat surface orthogonal to the central axis, and a radial outer end portion of the upper end surface of the die pin 27 is a ring-shaped flat surface parallel to the circular flat surface and arranged slightly lower than the circular flat surface. Further, a portion, located between the two flat surfaces in the radial direction, of the upper end surface of the die pin 27 is a first preliminary rounding-chamfering surface 32.

The first preliminary rounding-chamfering surface 32 is inclined in an upward direction toward a radial inner side and has an annular shape, and a section thereof has a quarter-concave arc shape. A radius of curvature $R_1$ of the sectional shape of the first preliminary rounding-chamfering surface 32 is greater than a radius of curvature $r_1$ of a sectional shape of a first normal rounding-chamfering surface 55 described later ($R_1 > r_1$).

The punch 28 is made in a columnar shape. The punch 28 is inserted into the large-diameter cylindrical surface portion 30 of the center hole of the die 26 from above, and is internally fitted to the large-diameter cylindrical surface portion 30 without radial rattling. A radial central portion of a lower end surface of the punch 28 is a circular flat surface orthogonal to the central axis, and a radial outer end portion of the lower end surface of the punch 28 is a ring-shaped flat surface parallel to the circular flat surface and arranged slightly upper than the circular flat surface. A portion, sandwiched between the two flat surfaces in the radial direction, of the lower end surface of the punch 28 is a second preliminary rounding-chamfering surface 33. The second preliminary rounding-chamfering surface 33 is inclined in a downward direction toward a radial inner side and has an annular shape, and a section thereof has a quarter-concave arc shape. A radius of curvature $R_2$ of the sectional shape of the second preliminary rounding-chamfering surface 33 is larger than a radius of curvature $r_2$ of a sectional shape of a second normal rounding-chamfering surface 60 described later ($R_2 > r_2$).

In the case of this example, an inner diameter, an outer diameter, and the radius $R_1$ of curvature of the first preliminary rounding-chamfering surface 32 are the same as an inner diameter, an outer diameter and the radius $R_2$ of curvature of the second preliminary rounding-chamfering surface 33, respectively.

In the case where the billet 8 is subjected to upsetting by cold forging as described above by such a mold device 25, as shown in FIG. 1A, the billet 8 is set to the mold device 25. Specifically, before the punch 28 is inserted into the center hole of the die 26, an outer diameter of the lower end portion of the billet 8 is restrained by internally fitting the lower end portion of the billet 8 into an upper end portion of the small-diameter cylindrical surface portion 29 of the center hole of the die 26 without rattling in the radial direction. At the same time, the billet 8 is placed on the upper end surface of the die pin 27 (the lower end surface of the billet 8 is abutted against a flat surface provided on a central portion of the upper end surface of the die pin 27). In this state, the punch 28 is inserted into the large-diameter cylindrical surface portion 30 of the center hole from above, and the flat surface provided on the central portion of the lower end surface of the punch 28 is abutted against an upper end surface of the billet 8.

Then, the punch 28 is further lowered to crush the billet 8 in the axial direction between the lower end surface of the punch 28 and the upper end surface of the die pin 27 from this state. Then, the billet 8 is plastically deformed as shown in FIG. 1A to FIG. 1B so as to obtain the first intermediate material 21 having a small-diameter portion 34 and a large-diameter portion 35.

An outer diameter of the small-diameter portion 34 of the first intermediate material 21 is equal to the inner diameter of the small-diameter cylindrical surface portion 29 of the center hole of the die 26, and an outer diameter of the large-diameter portion 35 of the first intermediate material 21 is equal to the inner diameter of the large-diameter cylindrical surface portion 30 of the center hole of the die 26.

A lower end surface of the small-diameter portion 34 of the first intermediate material 21 is processed into a shape matching with the upper end surface of the die pin 27. Particularly, a portion matching with the first preliminary rounding-chamfering surface 32 at a radial intermediate portion of the lower end surface of the small-diameter portion 34 of the first intermediate material 21 is a first preliminary rounding-chamfer portion 36 having a quarter-convex arc sectional shape. A radius of curvature of the sectional shape of the first preliminary rounding-chamfer portion 36 is also $R_1$ as that of the first preliminary rounding-chamfering surface 32. Further, since the sectional shape of the first preliminary rounding-chamfer portion 36 is a quarter-convex arc, a width dimension of the first preliminary rounding-chamfer portion 36 in the radial direction (and the axial direction) is also $R_1$.

An upper end surface of the large-diameter portion 35 of the first intermediate material 21 is processed into a shape matching with the lower end surface of the punch 28. Particularly, a portion matching with the second preliminary rounding-chamfering surface 33 at a radial intermediate portion of the upper end surface of the large-diameter portion 35 of the first intermediate material 21 is a second preliminary rounding-chamfer portion 37 having a quarter-convex arc sectional shape. A radius of curvature of the sectional shape of the second preliminary rounding-chamfer portion 37 is also $R_2$ as that of the second preliminary rounding-chamfering surface 33. Further, since the sectional shape of the second preliminary rounding-chamfer portion 37 is a quarter-convex arc, a width dimension of the second preliminary rounding-chamfer portion 37 in the radial direction (and the axial direction) is also $R_2$.

Such a first intermediate material 21 is taken out from the die 26, for example, by raising the die pin 27 after raising the punch 28, and sent to a next second step. In the case of this example, each of the first and second preliminary rounding-chamfer portions 36, 37 corresponds to a preliminary chamfer portion respectively.

[Second Step]

In a second step, the first intermediate material 21 is subjected to front-rear extrusion by cold forging using a mold device 38 as shown in FIG. 2, so as to obtain the second intermediate material 22. The mold device 38 includes a floating die 39, a counter punch 40, and a punch 28a.

The floating die 39 has an inner peripheral surface with a stepped cylindrical shape. That is, the inner peripheral surface of the floating die 39 with a stepped cylindrical shape has a small-diameter cylindrical surface portion 41 on a lower side and a large-diameter cylindrical surface portion 42 on an upper side arranged coaxially with each other, and a ring-shaped step portion 43 orthogonal to a central axis of the small-diameter cylindrical surface portion 41 and the large-diameter cylindrical surface portion 42. The small-diameter cylindrical surface portion 41 and the large-diameter cylindrical surface portion 42 are connected by the step portion 43. A stopper 44 for limiting the lowering amount of the floating die 39 is provided below the floating die 39. Further, an elastic member 45 such as a compression coil spring or a disc spring is provided between a lower end surface of the floating die 39 and an upper surface of the stopper 44 to apply an elastic force to the floating die 39 in an upward direction. The elastic force is smaller than a pressing force of the punch 28a, but is large such that a part of the first intermediate material 21 can be plastically deformed.

The counter punch 40 is made in a columnar shape. The counter punch 40 is provided coaxially with the small-diameter cylindrical surface portion 41, inside the small-diameter cylindrical surface portion 41 of a center hole of the floating die 39. An outer diameter of the counter punch 40 is smaller than an inner diameter of the small-diameter cylindrical surface portion 41 and is substantially equal to an inner diameter of the first preliminary rounding-chamfer portion 36 of the lower end surface of the small-diameter portion 34 of the first intermediate material 21. The entirety of upper end surface of the counter punch 40 is a flat surface orthogonal to a central axis of the counter punch 40.

The punch 28a is made in a columnar shape. The punch 28a is inserted into the large-diameter cylindrical surface portion 42 of the center hole of the floating die 39 from above, and is provided coaxially with the large-diameter cylindrical surface portion 42. An outer diameter of the punch 28a is larger than the inner diameter of the small-diameter cylindrical surface portion 41 of the center hole of the floating die 39 (and the outer diameter of the second preliminary rounding-chamfer portion 37 provided on the upper end surface of the large-diameter portion 35 of the first intermediate material 21), and is smaller than an inner diameter of the large-diameter cylindrical surface portion 42 (and the outer diameter of the large-diameter portion 35 of the first intermediate material 21). Further, a lower end surface of the punch 28a has a shape substantially matching with a portion, except for a radial outer end portion (a radial outer half portion of a ring-shaped flat surface provided on a radial outer side from the second preliminary rounding-chamfer portion 37), of the upper end surface of the large-diameter portion 35 of the first intermediate material 21.

Figure 2A:
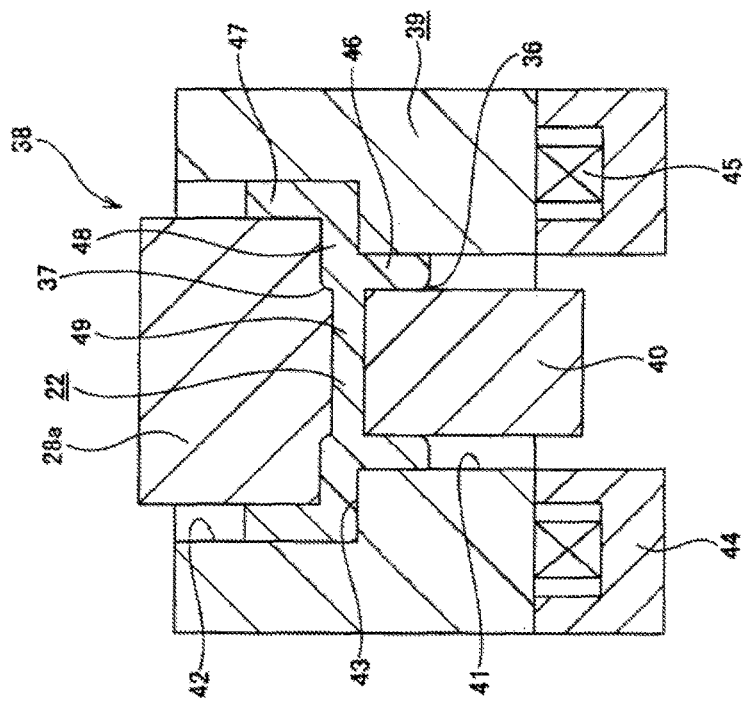
FIG. 2A and FIG. 2B are sectional views showing a second step of the first example according to the embodiment of the present invention.

In the case where the first intermediate material 21 is subjected to front-rear extrusion by cold forging as described above using such a mold device 38, as shown in FIG. 2A, the first intermediate material 21 is set to the mold device 38. Specifically, before the punch 28a is inserted into the center hole of the floating die 39, the small-diameter portion 34 of the first intermediate material 21 is internally fitted to the small-diameter cylindrical surface portion 41 of the center hole of the floating die 39 without radial rattling, and the large-diameter portion 35 of the first intermediate material 21 is internally fitted to the large-diameter cylindrical surface portion 42 of the center hole of the floating die 39 without radial rattling. In this state, the first intermediate material 21 is placed on the step portion 43 of the center hole of the floating die 39 (a lower surface of the radial outer end portion of the large-diameter portion 35 is abutted against the step portion 43). At the same time, a circular flat surface, existing on a radial inner side of the first preliminary rounding-chamfer portion 36, of the lower end surface of the small-diameter portion 34 of the first intermediate material 21 is abutted against the upper end surface of the counter punch 40.

In this state, the punch 28a is inserted into the large-diameter cylindrical surface portion 42 of the center hole of the floating die 39 from above, and the lower end surface of the punch 28a is abutted against a portion, except for the radial outer end portion, of an upper surface of the large-diameter portion 35 of the first intermediate material 21 so as to match therewith.

From this state, the punch 28a is further lowered to crush the radial central portion of the first intermediate material 21 in the axial direction between the lower end surface of the punch 28a and the upper end surface of the counter punch 40. Therefore, as shown in FIG. 2A to FIG. 2B, a metal material pushed to a radial outer side by crushing enters between the outer peripheral surface of counter punch 40 and the small-diameter cylindrical surface portion 41 of the center hole of the floating die 39, and enters between the outer peripheral surface of the punch 28a and the large-diameter cylindrical surface portion 42 of the center hole. As a result, the second intermediate material 22 as shown in FIG. 2B is obtained.

The second intermediate material 22 includes a small-diameter cylindrical portion 46 on a lower side and a large-diameter cylindrical portion 47 on an upper side which are arranged coaxially with each other, an annular connection portion 48 connecting an outer peripheral surface of an upper end portion of the small-diameter cylindrical portion 46 and an inner peripheral surface of a lower end portion of the large-diameter cylindrical portion 47, and a disk-shaped bottom plate portion 49 for closing an upper end opening of the small-diameter cylindrical portion 46. The first preliminary rounding-chamfer portion 36 is arranged on a radial inner end portion of the lower end surface of the small-diameter cylindrical portion 46, and the second preliminary rounding-chamfer portion 37 is arranged on a radial inner end portion of the upper end surface of the small-diameter cylindrical portion 46.

In the state shown in FIG. 2B, a lower end surface of the floating die 39 is abutted against the upper surface of the stopper 44, and the lowering of the floating die 39 is stopped. In this way, it is possible to process the second intermediate material 22 with high accuracy by lowering the punch 28a to a state where the punch 28a does not lower further (until a processing cavity is fully filled with the metal material). For example, the second intermediate material 22 is taken out from the floating die 39 by raising the counter punch 40 after raising the punch 28a and sent to a next third step.

[Third Step]

In a third step, the second intermediate material 22 is subjected to punching to punch out the bottom plate portion 49 of the second intermediate material 22, so as to obtain the third intermediate material 23 as shown in FIG. 3. In the illustrated example, a punching direction of the bottom plate portion 49 is upward, but the punching direction may be downward. In any case, the third intermediate material 23 as described above is taken out from a device for punching and sent to a next fourth step.

[Fourth Step]

Figure 4A:
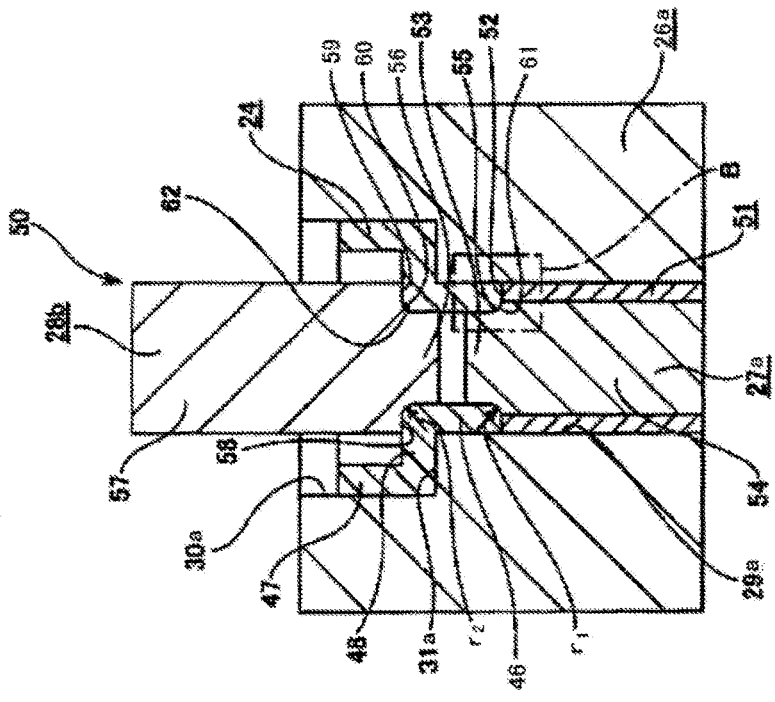
FIG. 4A and FIG. 4B are sectional views showing a fourth step of the first example according to the embodiment of the present invention.
Figure 4B:
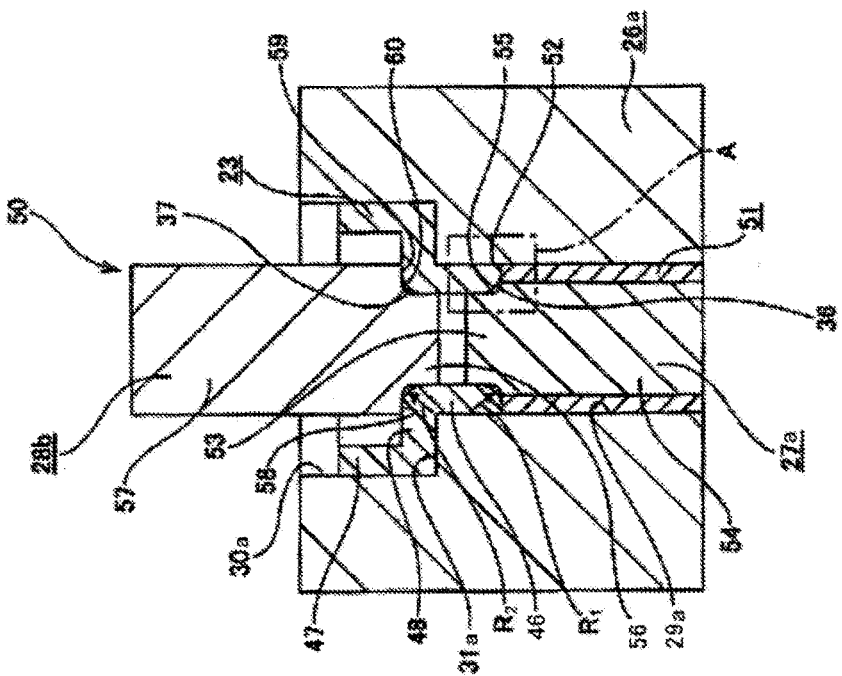

In a fourth step, the third intermediate material 23 is processed by cold forging using a mold device 50 as shown in FIGS. 4A to 5, so that a shape and a dimension of the small-diameter cylindrical portion 46 are brought similar to a shape and a dimension of a final product, so as to obtain a fourth intermediate material 24. In the case of this example, the fourth step corresponds to a chamfering step by cold forging. The mold device 50 used in the fourth step includes a die 26a, a sleeve 51, a die pin 27a, and a punch 28b.

The die 26a has an inner peripheral surface with a stepped cylindrical shape. That is, an inner peripheral surface of the die 26a with a stepped cylindrical shape has a small-diameter cylindrical surface portion 29a on a lower side and a large-diameter cylindrical surface portion 30a on an upper side arranged coaxially with each other, and a ring-shaped step portion 31a orthogonal to a central axis of the small-diameter cylindrical surface portion 29a and the large-diameter cylindrical surface portion 30a. The small-diameter cylindrical surface portion 29a and the large-diameter cylindrical surface portion 30a are connected by the step portion 31a.

The sleeve 51, which corresponds to a second mold, is made in a cylindrical shape. The sleeve 51 is internally fitted to an intermediate portion from a lower end portion of the small-diameter cylindrical surface portion 29a of a center hole of the die 26a without radial rattling. An inner diameter of the sleeve 51 is larger than an inner diameter of the small-diameter cylindrical portion 46 of the third intermediate material 23 and slightly smaller than the outer diameter of the first preliminary rounding-chamfer portion 36 provided on an inner peripheral edge of the lower end portion of the small-diameter cylindrical portion 46. An upper end surface of the sleeve 51 is a ring-shaped holding surface 52 orthogonal to a central axis of the sleeve 51.

The die pin 27a, which corresponds to a mold, is made in a stepped columnar shape. The die pin 27a is internally fitted to the sleeve 51 without radial rattling. The die pin 27a includes a small-diameter columnar portion 53 located on an upper end portion and a large-diameter columnar portion 54 located on an intermediate portion from a lower end portion which are arranged coaxially with each other.

Outer peripheral surfaces of the small-diameter and large-diameter columnar portions 53, 54 correspond to chamfering surfaces and are connected to each other by a first normal rounding-chamfering surface 55. The first normal rounding-chamfering surface 55 is inclined in an upward direction toward a radial inner side, and has an annular surface with a quarter-concave arc sectional shape. As described above, a radius of curvature $r_1$ of the sectional shape of the first normal rounding-chamfering surface 55 is smaller than the radius of curvature $R_1$ of the sectional shape of the first preliminary rounding-chamfering surface 32 (first preliminary rounding-chamfer portion 36) ($r_1 < R_1$). Since the sectional shape of the first normal rounding-chamfering surface 55 has a quarter-concave arc shape, a width dimension of the first normal rounding-chamfering surface 55 in a radial direction (and an axial direction) is also $r_1$. Accordingly, in the case of this example, the width dimension $R_1$ of the first preliminary rounding-chamfer portion 36 in the radial direction (and the axial direction) is larger than the width dimension $r_1$ of the first normal rounding-chamfering surface 55 in the radial direction (and the axial direction).

The first normal rounding-chamfering surface 55 of the die pin 27a is arranged adjacent to a radial inner side of the holding surface 52 which is an upper end surface of the sleeve 51 in a state where the large-diameter columnar portion 54 of the die pin 27a is internally fitted to the sleeve 51 without radial rattling.

The punch 28b, which corresponds to a mold configuring a mold device, is made in a stepped columnar shape. The punch 28b is inserted into the large-diameter cylindrical surface portion 30a of the center hole of the die 26a from above and provided coaxially with the large-diameter cylindrical surface portion 30a. The punch 28b includes a small-diameter columnar portion 56 located on a lower end portion and a large-diameter columnar portion 57 located on an intermediate portion from an upper end portion which are arranged coaxially with each other.

Outer peripheral surfaces of the small-diameter and large-diameter columnar portions 56, 57 are connected by a step portion 58. A portion except for a radial inner end portion of the step portion 58 is a ring-shaped pressing surface 59 orthogonal to a central axis. The radial inner end portion of the step portion 58, which corresponds to a chamfering surface, is a second normal rounding-chamfering surface 60. The second normal rounding-chamfering surface 60 is inclined in a downward direction toward a radial inner side, and is an annular surface having a quarter-concave arc sectional shape. As described above, a radius of curvature $r_2$ of the sectional shape of the second normal rounding-chamfering surface 60 is smaller than the radius of curvature $R_2$ of the sectional shape of the second preliminary rounding-chamfering surface 33 (second preliminary rounding-chamfer portion 37) $R_2$ ($r_2 < R_2$). Since the sectional shape of the second normal rounding-chamfering surface 60 is a quarter-concave arc shape, a width dimension in a radial direction (and an axial direction) of the second normal rounding-chamfering surface 60 is also $r_2$. Therefore, in the case of this example, the width dimension $R_2$ of the second preliminary rounding-chamfer portion 37 in the radial direction (and the axial direction) is larger than the width dimension $r_2$ of the second normal rounding-chamfering surface 60 in the radial direction (and the axial direction). The outer diameter of the large-diameter columnar portion 57 (an outer diameter of the pressing surface 59) is smaller than that of the large-diameter cylindrical surface portion 30a of the center hole and is substantially equal to an inner diameter of the small-diameter cylindrical surface portion 29a of the central hole.

Figure 5A:
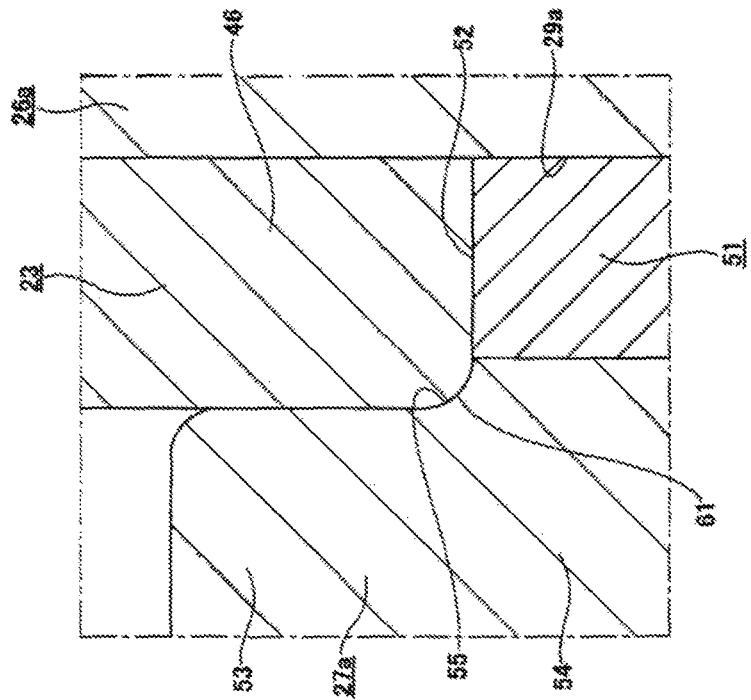
FIG. 5A is an enlarged view of Part A in FIG. 4A.

In the case where the third intermediate material 23 is processed by cold forging as described above using such a mold device 50, as shown in FIGS. 4A and 5A, the third intermediate material 23 is set to the mold device 50. Specifically, before the punch 28b is inserted into the center hole of the die 26a, the small-diameter cylindrical portion 46 of the third intermediate material 23 is internally fitted to the small-diameter cylindrical surface portion 29a of the center hole of the die 26a without radial rattling, the large-diameter cylindrical portion 47 is internally fitted to the large-diameter cylindrical surface portion 30a of the center hole of the die 26a without radial rattling, and the third intermediate material 23 is placed on the step portion 31a (the large-diameter cylindrical portion 47 and a lower surface of the connection portion 48 are abutted against the step portion 31a). At the same time, a portion, adjacent to a radial outer side with respect to the first preliminary rounding-chamfer portion 36, of the lower end surface of the small-diameter cylindrical portion 46 of the third intermediate material 23 is brought into contact with a radial inner end side portion (a portion slightly closer to a radial outer side than a radial inner end edge) of the holding surface 52 which is an upper end surface of the sleeve 51.

In this state, the first normal rounding-chamfering surface 55 provided on the die pin 27a is not brought into contact with the first preliminary rounding-chamfer portion 36 provided on the radial inner end portion of the lower end surface of the small-diameter cylindrical portion 46, and is close and opposed thereto in the axial direction. In this state, the punch 28b is inserted into the large-diameter cylindrical surface portion 30a of the center hole of the die pin 27a from above, and the small-diameter columnar portion 56 of the punch 28b is internally fitted to the upper end portion of the small-diameter cylindrical portion 46 without radial rattling. At the same time, the pressing surface 59 of the step portion 58 of the punch 28b is abutted against a portion, adjacent to a radial outer side of the second preliminary rounding-chamfer portion 37, of the upper end surface of the small-diameter cylindrical portion 46. In this state, the second normal rounding-chamfering surface 60 of the step portion 58 is not brought into the second preliminary rounding-chamfer portion 37 provided on the radial inner end portion of the upper end portion of the small-diameter cylindrical portion 46, and is close and opposed thereto in the axial direction.

In the case of this example, in this state, the holding surface 52 which is the upper end portion of the sleeve 51 is located slightly above a lower end edge (a radial outer end edge) of the first normal rounding-chamfering surface 55 by the dimension X. The reason for this is as follows. That is, in the case of this example, after the completion of processing in the fourth step described later, only the sleeve 51 among the die 26a, the sleeve 51, and the die pin 27a is raised after raising the punch 28b so that a workpiece after processing (the fourth intermediate material 24) is discharged from the die 26a. Therefore, in the case of this example, the sleeve 51 is provided separately from the die 26a and the die pin 27a, and is a movable part that may be displaceable in the vertical direction (axial direction) with respect to the die 26a and the die pin 27a. The sleeve 51, which is such a movable part, is displaced slightly downward (by the dimension X) due to elastic deformation of a movable mechanism by a downward pressure applied from the small-diameter cylindrical portion 46 when performing the fourth step described later. Therefore, in the case of this example, at the stage of setting the third intermediate material 23 to the mold device 50 as described above, that is, at a start stage of processing in the fourth step described later, the holding surface 52 which is the upper end surface of the sleeve 51 is located above the lower end edge of the first normal rounding-chamfering surface 55 by an amount of a downward displacement (by the dimension X). Thereby, vertical positions of the holding surface 52 and the lower end edge of the first normal rounding-chamfering surface 55 coincide with each other at a final stage of processing in the fourth step described later.

Figure 5B:
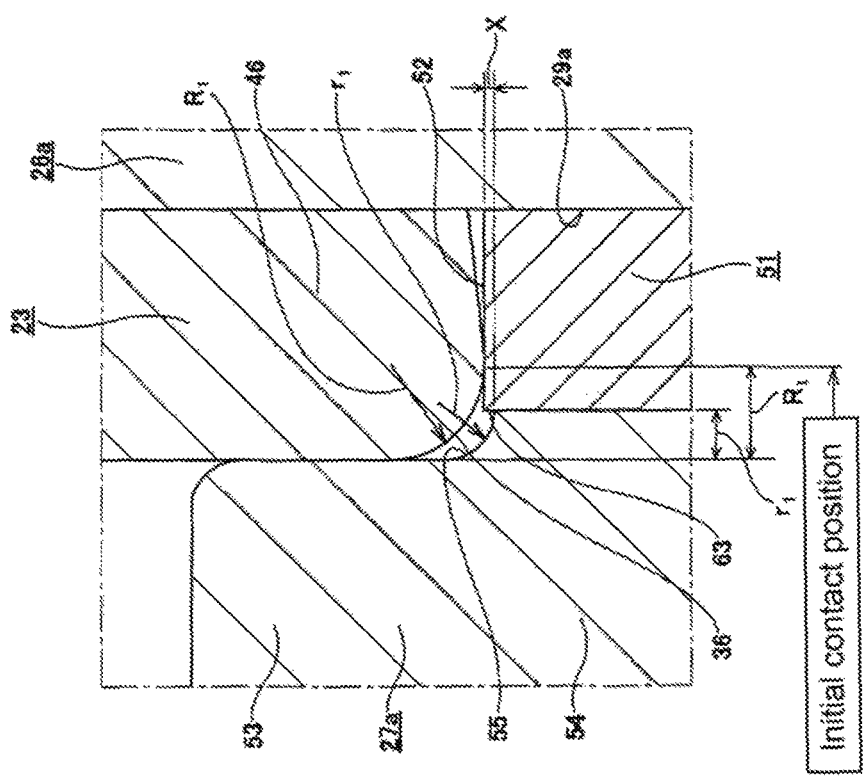
FIG. 5B is an enlarged view of Part B in FIG. 4B.

In the case of this embodiment, from the state where the third intermediate material 23 is set to the mold device 50 as described above, the punch 28b is further lowered as shown in the order of FIG. 4A to FIG. 4B and in the order of FIG. 5A to FIG. 5B. Thereby, the small-diameter cylindrical portion 46 of the third intermediate material 23 between the step portion 58 (the pressing surface 59 and the second normal rounding-chamfering surface 60) of the punch 28b and the holding surface 52 of the sleeve 51 and the first normal rounding-chamfering surface 55 of the die pin 27a is compressed in the axial direction. As a result, the pressing surface 59 and the second normal rounding-chamfering surface 60 are pressed against the upper end surface of the small-diameter cylindrical portion 46 in the axial direction, and the holding surface 52 and the first normal rounding-chamfering surface 55 are pressed against the lower end surface of the small-diameter cylindrical portion 46 in the axial direction.

Thereby, an axial dimension of the small-diameter cylindrical portion 46 is reduced to a predetermined length. At the same time, the second normal rounding-chamfer portion 62 is formed on the radial inner end portion (the inner peripheral edge), which is a portion pressed against the second normal rounding-chamfering surface 60, of the upper end surface of the small-diameter cylindrical portion 46. A shape of the second normal rounding-chamfer portion 62 coincides with that of the second normal rounding-chamfering surface 60, and a section thereof has a quarter-convex arc shape. That is, a radius of curvature of the sectional shape of the second normal rounding-chamfer portion 62 is $r_2$ as that of the second normal rounding-chamfering surface 60.

At the same time, a first normal rounding-chamfer portion 61 is formed on the radial inner end portion (inner peripheral edge), which is a portion pressed against the first normal rounding-chamfering surface 55, of the lower end surface of the small-diameter cylindrical portion 46. A shape of the first normal rounding-chamfer portion 61 coincides with that of the first normal rounding-chamfering surface 55, and a section thereof has a quarter-convex arc shape. That is, a radius of curvature of the sectional shape of the first normal rounding-chamfer portion 61 is $r_1$ as that of the first normal rounding-chamfering surface 55.

As described above, in the case of this example, the holding surface 52 is displaced slightly downward based on the downward pressure applied from the small-diameter cylindrical portion 46 with the processing in the fourth step. Then, the vertical positions of the holding surface 52 and the lower end edge of the first normal rounding-chamfering surface 55 coincide with each other at the final stage of this processing. In the case of this example, each of the first and second normal rounding-chamfer portions 61, 62 corresponds to a normal chamfer portion.

Figure 10:
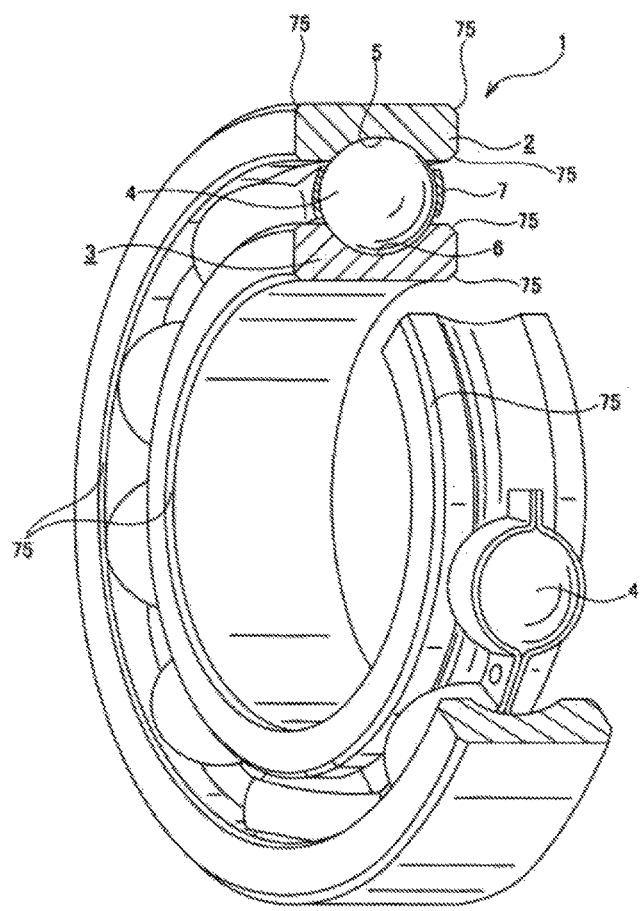
FIG. 10 is a partially sectional perspective view showing one example of a rolling bearing incorporating an outer ring and an inner ring.

An outer ring 2 and an inner ring 3 (see FIG. 10) configuring a radial ball bearing 1 are manufactured by punching for punching out the small-diameter cylindrical portion 46 (separating both the small-diameter and large-diameter cylindrical portions 46, 47) and punching for removing the connection portion 48 on the fourth intermediate material 24, and post-processing such as grinding and cutting.

Particularly, in the case of this example, following effects can be obtained with respect to the processing in the fourth step as described above.

That is, in the case of this example, the processing in the fourth step as described above is performed in a state where the first preliminary rounding-chamfer portion 36 (the second preliminary rounding-chamfer portion 37) in which the width dimension $R_1$ ($R_2$) thereof in the radial direction (and the axial direction) is larger than the radial width dimension $r_1$ ($r_2$) of the normal rounding-chamfering surface 55 (the second normal rounding-chamfering surface 60) in the radial direction is formed on inner peripheral edges of both axial end portions (upper and lower end portions) of the small-diameter cylindrical portion 46. That is, the first normal rounding-chamfer portion 61 (the second normal rounding-chamfer portion 62) is formed on the inner peripheral edges of both axial end portions of the small-diameter cylindrical portion 46 by pressing the radial inner end portion of the lower end surface (upper end surface) of the small-diameter cylindrical portion 46 against the first normal rounding-chamfering surface 55 (the second normal rounding-chamfering surface 60).

Therefore, as in the conventional method described in the above-described Patent Document 1, it can be avoided that a sharp end edge is initially brought into contact with a chamfering surface having an arc sectional shape (the first normal rounding-chamfering surface 55 or the second normal rounding-chamfering surface 60). As a result, when forming the first and second normal rounding-chamfer portions 61, 62 by cold forging, a material of the third intermediate material 23 can flow smoothly on the inner peripheral edges of both axial end portions of the small-diameter cylindrical portion 46, and the shape accuracy of the first normal rounding-chamfer portion 61 and the second normal rounding-chamfer portion 62 formed on inner peripheral edge portions of both upper and lower end portions of the small-diameter cylindrical portion 46 can be improved.

In the case of this example, at the start stage of processing in the above-described fourth step, a radial inner end side portion (a portion slightly closer to a radial outer side than a radial inner end edge in a portion distant from the radial inner end edge) of the holding surface 52 is initially brought into contact with the radial intermediate portion of the lower end surface of the small-diameter cylindrical portion 46 (a portion located on a radial outer side from the outer peripheral edge of the first preliminary rounding-chamfer portion 36). In this state, the first preliminary rounding-chamfer portion 36, which is a portion opposed to the first normal rounding-chamfering surface 55 in the axial direction, of the lower end surface of the small-diameter cylindrical portion 46 is located above a virtual plane including the holding surface 52.

Therefore, in the case of this example, in the process in which the holding surface 52 is displaced downward based on the pressure applied from the small-diameter cylindrical portion 46 as the processing in the above-described fourth step proceeds, a material of the inner peripheral edge (the portion where the first preliminary rounding-chamfer portion 36 is formed) of the lower end portion of the small-diameter cylindrical portion 46 may hardly flow downward from the virtual plane including the holding surface 52. As a result, in the case of this example, a part of the material enters into a boundary between the holding surface 52 and the first normal rounding-chamfering surface 55 (between an inner peripheral surface of the sleeve 51 and an outer peripheral surface of the large-diameter columnar portion 54 of the die pin 27a), and it is possible to prevent a burr from being formed.

On the contrary, a case different from the case of this example is considered in which the processing in the fourth step as described above is performed in a state where the first preliminary rounding-chamfer portion 36 is not formed on the inner peripheral edge of the lower end portion of a small-diameter cylindrical portion 46a and the entirety of the lower end surface of the small-diameter cylindrical portion 46a is formed as a flat surface (or a surface approximate to this flat surface) orthogonal to the axial direction.

Figure 6A:
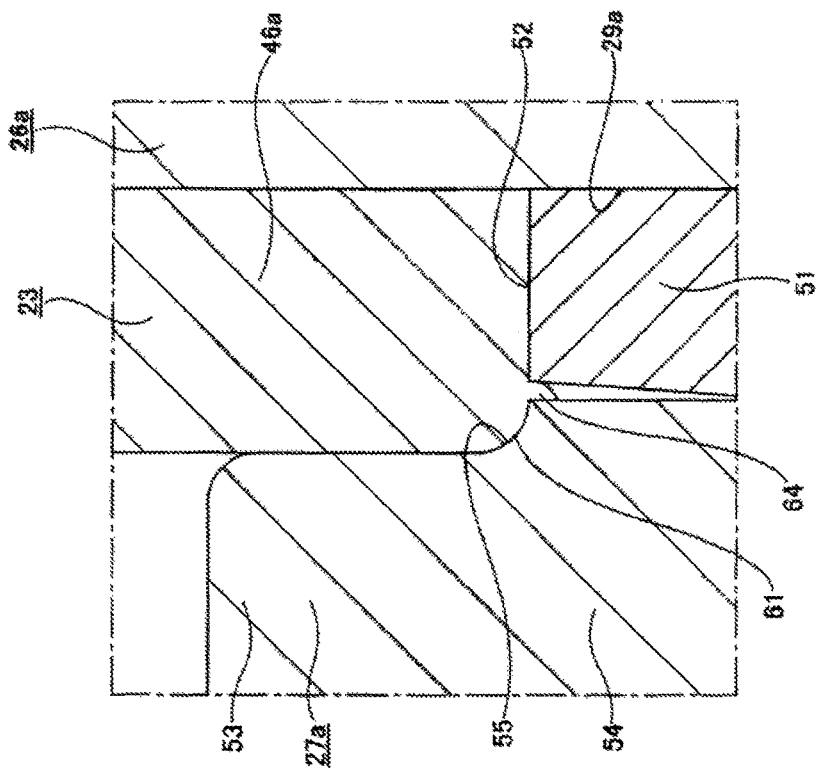
FIGS. 6A and 6B are enlarged views similar to FIG. 5A and FIG. 5B.

In this case, there is a possibility that the inner peripheral edge, which is the sharp end edge, of the lower end surface of the small-diameter cylindrical portion 46a is initially brought into contact with the first normal rounding-chamfering surface 55 in the start stage of the processing. In the process in which the holding surface 52 is displaced downward based on the pressure applied from the small-diameter cylindrical portion 46a as the processing in the above-described fourth step proceeds, as shown in FIG. 6A, there is a possibility that the material on the inner peripheral edge of the lower end portion of the small-diameter cylindrical portion 46a is brought into contact with a stepped surface 63 (an upper end portion of the inner peripheral surface of the sleeve 51) existing between the first normal rounding-chamfering surface 55 and the holding surface 52 while the material flows below from the virtual plane including the holding surface 52.

Figure 6B:
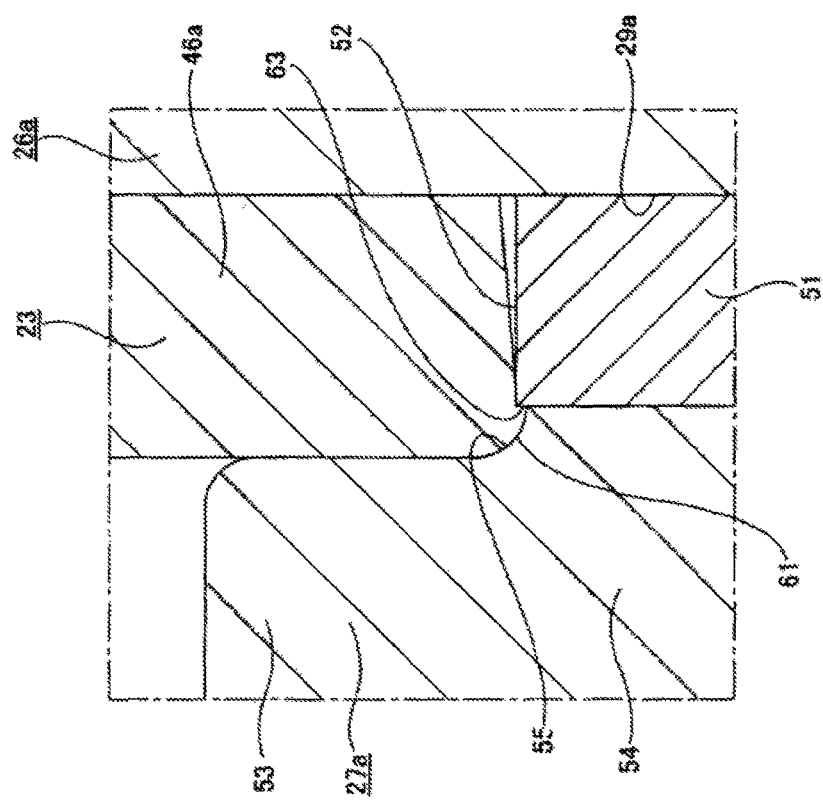

In the case of this contact, thereafter, in the process in which the holding surface 52 is displaced downward until the holding surface 52 is at the same vertical position as the lower end edge of the first normal rounding-chamfering surface 55, as shown in FIG. 6B, a part of the material enters into the boundary between the holding surface 52 and the first normal rounding-chamfering surface 55 (between the inner peripheral surface of the sleeve 51 and the outer peripheral surface of the large-diameter columnar portion 54 of the die pin 27a), so that there is a possibility that a burr 64 is formed.

In the case of this example, it is possible to prevent such a burr 64 from being formed.

Further, in the case of this example, the processing for forming the first and second preliminary rounding-chamfer portions 36, 37 and the processing for forming the small-diameter portion 34 and the large-diameter portion 35 in the first step are performed at the same time. Therefore, it is possible to suppress an increase in manufacturing cost by previously forming the first and second preliminary rounding-chamfer portions 36, 37.

Second Example

Hereinafter, a second example according to the embodiment of the present invention will be described with reference to FIGS. 7 to 9.

This example will also be described below in the order of steps. Incidentally, in the following description of this example, a vertical direction refers to a vertical direction in FIGS. 7 to 9. However, the vertical direction in FIGS. 7 to 9 does not necessarily coincide with a vertical direction during processing.

[First Step]

Figure 7:
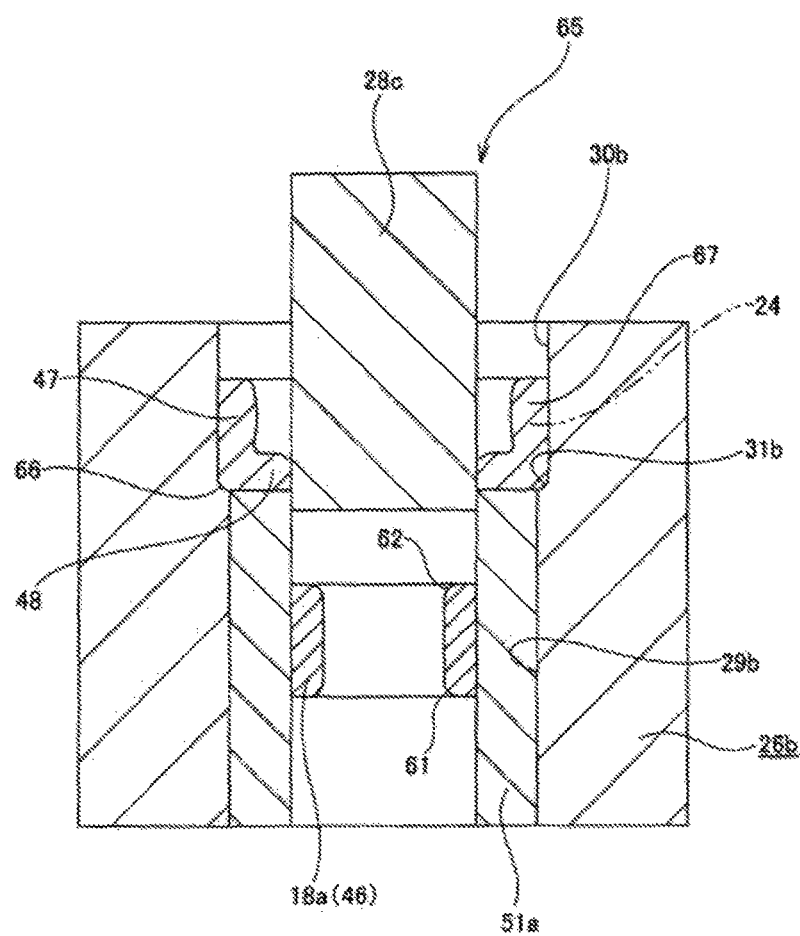
FIG. 7 is a sectional view showing a first step of a second example according to the embodiment of the present invention.

In a first step, the fourth intermediate material 24 obtained in the fourth step of the first example described above is subjected to punching using a mold device 65 as shown in FIG. 7. A portion corresponding to the small-diameter cylindrical portion 46 is punched out from the fourth intermediate material 24 to obtain a small-diameter cylindrical ring member 18a.

The mold device 65 used in the first step includes a die 26b, a sleeve 51a, and a punch 28c.

The die 26b has an inner peripheral surface with a stepped cylindrical shape. That is, an inner peripheral surface of the die 26b with a stepped cylindrical shape has a small-diameter cylindrical surface portion 29b on a lower side and a large-diameter cylindrical surface portion 30b on an upper side arranged coaxially with each other, and a step portion 31b connecting the small-diameter cylindrical surface portion 29b and the large-diameter cylindrical surface portion 30b on the upper side.

The sleeve 51a is made in a cylindrical shape. The sleeve 51a is internally fitted into the small-diameter cylindrical surface portion 29b of a center hole of the die 26b without radial rattling.

The punch 28c is made in a columnar shape, and inserted into the center hole of the die 26b from above.

In the case where the fourth intermediate material 24 is subjected the above-described punching using such a mold device 65, before the punch 28c is inserted into the center hole of the die 26b, the small-diameter cylindrical portion 46 of the fourth intermediate material 24 is internally fitted to the small-diameter cylindrical surface portion 29b of the center hole of the die 26b without radial rattling, and the large-diameter cylindrical portion 47 of the fourth intermediate material 24 is internally fitted to the large-diameter cylindrical surface portion 30b of the center hole of the die 26b without radial rattling. The large-diameter cylindrical portion 47 of the fourth intermediate material 24 and the lower end surface of the connection portion 48 are supported by the step portion 31b of the center hole of the die 26b and an upper end surface of a sleeve 51a.

In this state, the punch 28c is inserted into the center hole of the die 26b from above, and a portion corresponding to the small-diameter cylindrical portion 46 is punched out by an outer peripheral edge portion of the lower end surface of the punch 28c and an inner peripheral edge portion of the upper end surface of the sleeve 51a. The small-diameter cylindrical ring member 18a punched in this manner is subjected to post-processing such as cutting and grinding, so that the inner ring 3 (see FIG. 10) configuring the radial rolling bearing 1 is obtained.

In the case of this example, the step portion 31b is inclined in an upward direction toward a radial outer side, and is an annularounding-chamfering surface having a quarter-concave arc sectional shape. When performing the punching, a radial outer end portion of the lower end surface of the large-diameter cylindrical surface portion 30b is pressed against a chamfering surface which is the step portion 31b in the axial direction by a punching load. Thereby, the radial outer end portion is processed into a fourth normal rounding-chamfer portion 66 with a quarter-convex arc sectional shape.

[Second Step]

Figure 8:
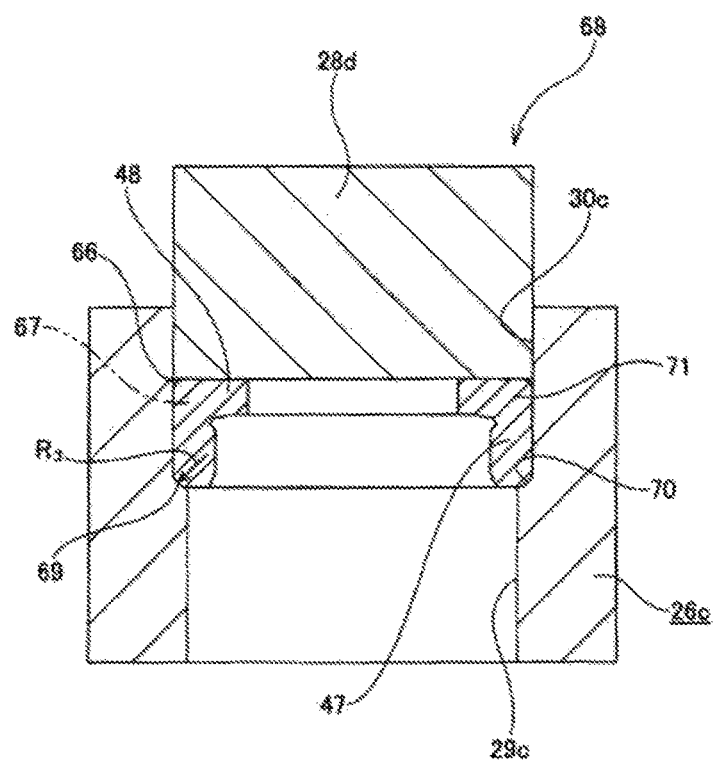
FIG. 8 is a sectional view showing a second step the second example according to the embodiment of the present invention.

In a second step, a fifth intermediate material 67, which is a remaining portion after separating a portion corresponding to the small-diameter cylindrical portion 46 in the above-described first step, is subjected to processing by cold forging using a mold device 68 as shown in FIG. 8, so that a sixth intermediate material 71 forming a third preliminary rounding-chamfer portion 69 is formed.

The mold device 68 used in the second step includes a die 26c and a punch 28d.

The die 26c has an inner peripheral surface with a stepped cylindrical shape. That is, an inner peripheral surface of the die 26c with a stepped cylindrical shape has a small-diameter cylindrical surface portion 29c on a lower side and a large-diameter cylindrical surface portion 30c on an upper side arranged coaxially with each other, and a third preliminary rounding-chamfering surface 70. The third preliminary rounding-chamfering surface 70 is inclined in an upward direction toward a radial outer side and has an annular shape, and a section thereof has a quarter-concave arc shape. A radius of curvature $R_3$ of the sectional shape of the third preliminary rounding-chamfering surface 70 is larger than a radius of curvature $r_3$ of a sectional shape of a third normal rounding-chamfering surface 73 ($R_3 > r_3$).

The punch 28d is made in a columnar shape. The punch 28d is inserted into the large-diameter cylindrical surface portion 30c of a center hole of the die 26c from above, and is internally fitted thereto without radial rattling.

In the case where the fifth intermediate material 67 is subjected to processing by cold forging described above using such a mold device 68, before the punch 28d is inserted into the center hole of the die 26c, the fifth intermediate material 67 is internally fitted to the large-diameter cylindrical surface portion 30c of the center hole of the die 26c without radial rattling in a state where the fifth intermediate material 67 is inverted upside down (a state where the connection portion 48 is arranged on an upper side), and the radial outer end portion of the lower end surface (an upper end surface in FIG. 7) of the large-diameter cylindrical portion 47 of the fifth intermediate material 67 is supported by the third preliminary rounding-chamfering surface 70 of the center hole of the die 26c.

In this state, the punch 28d is inserted into the center hole of the die 26c from above, and an upper end surface of the fifth intermediate material 67 is pressed by a lower end surface of the punch 28d. Thereby, the radial outer end portion of the lower end surface of the large-diameter cylindrical portion 47 is pressed against the third preliminary rounding-chamfering surface 70 in the axial direction, so that the third preliminary chamfer portion 69 having a quarter-convex arc sectional shape is formed on the outer peripheral edge of the lower end portion of the large-diameter cylindrical portion 47. A radius of curvature of the sectional shape of the third preliminary rounding-chamfer portion 69 is $R_3$ as that of the third preliminary rounding-chamfering surface 70. Since the sectional shape of the third preliminary rounding-chamfer portion 69 is a quarter-convex arc, a width dimension of the third preliminary rounding-chamfer portion 69 in the radial direction (and the axial direction) is also $R_3$. In the case of this example, the third preliminary rounding-chamfer portion 69 corresponds to a preliminary chamfer portion.

[Third Step]

In a third step, the sixth intermediate material 71 obtained by the above-described second step is subjected to punching for removing the connection portion 48 using a mold device 72 as shown in FIG. 9, so that a large-diameter cylindrical ring member 20a is obtained. In the case of this example, the third step corresponds to a chamfering step by cold forging.

The mold device 72 used in the third step includes a die 26d, a sleeve 51b, and a punch 28e.

The die 26d corresponds to a mold, and has an inner peripheral surface with a stepped cylindrical shape. That is, an inner peripheral surface of the die 26d with a stepped cylindrical shape has a small-diameter cylindrical surface portion 29d on a lower side and a large-diameter cylindrical surface portion 30d on an upper side arranged coaxially with each other, and the third normal rounding-chamfering surface 73 corresponding to a chamfering surface. The small-diameter cylindrical surface portion 29d and the large-diameter cylindrical surface portion 30d are connected with each other by the third normal rounding-chamfering surface 73.

The third normal rounding-chamfering surface 73 is inclined in an upward direction toward a radial outer side, and has an annular surface having a quarter-convex arc sectional shape. As described above, a radius of curvature $r_3$ of the sectional shape of the third normal rounding-chamfering surface 73 is smaller than the radius of curvature $R_3$ of the sectional shape of the third preliminary rounding-chamfering surface 70 (the third preliminary rounding-chamfer portion 69) ($r_3 < R_3$). Since the sectional shape of the third normal rounding-chamfering portion 73 is a quarter-concave arc, a width dimension of the third normal rounding-chamfering portion 73 in the radial direction (and the axial direction) is also $r_3$. Therefore, in the case of this example, a width dimension $R_3$ of the third preliminary chamfer portion 69 in the radial direction (and the axial direction) is larger than the width dimension $r_3$ of the third normal rounding-chamfering surface 73 in the radial direction (and the axial direction).

The sleeve 51b corresponds to a second mold, and is made in a columnar shape. An upper end surface of the sleeve 51b is a ring-shaped holding surface 52a orthogonal to the axial direction. The sleeve 51b is internally fitted to the small-diameter cylindrical surface portion 29d of the center hole of the die 26d without radial rattling. In this state, the holding surface 52a of the sleeve 51b is arranged adjacent to a radial inner side of the third normal rounding-chamfering surface 73.

The punch 28e is made in a columnar shape. An outer diameter of the punch 28e is slightly larger than the inner diameter of the large-diameter cylindrical portion 47 of the sixth intermediate material 71, and is substantially equal to the inner diameter of the sleeve 51b. The punch 28e is inserted into the center hole of the die 26d from above.

In the case where the sixth intermediate material 71 is subjected to processing by cold forging described above using such a mold device 72, before the punch 28e is inserted into the center hole of the die 26d, the sixth intermediate material 71 is internally fitted to the large-diameter cylindrical surface portion 30d of the center hole of the die 26d in a state where the connection portion 48 is arranged on the upper side. At the same time the lower end surface (the upper end surface in FIG. 7, and the lower end surface in FIG. 8) of the large-diameter cylindrical portion 47 of the sixth intermediate material 71 is brought into contact with the holding surface 52a which is the upper end surface of the sleeve 51b. Specifically, a portion, adjacent to a radial inner side with respect to the third preliminary rounding-chamfer portion 69, of the lower end surface of the large-diameter cylindrical portion 47 is brought into contact with a radial outer end side portion (a portion slightly closer to a radial inner side than a radial outer end edge in a portion distant from the radial outer end edge) of the holding surface 52a. In this state, the third normal rounding-chamfering surface 73 is not brought into contact with the third preliminary rounding-chamfer portion 69 provided on the radial outer end portion of the lower end surface of the large-diameter cylindrical portion 47, and is close and opposed thereto in the axial direction.

In the case of this example, in this state, the holding surface 52a, which is the upper end surface of the sleeve 51b, is located slightly above (by the dimension Y) a lower end edge (a radial inner end edge) of the third normal rounding-chamfering surface 73. The reason is that, similar to the case where the sleeve 51 (see FIG. 4) is used in the fourth step of the first embodiment described above, the sleeve 51b is a movable part displaceable in the vertical direction with respect to the die 26d (a part for taking out the large-diameter cylindrical ring member 20a which is a workpiece after processing from the die 26d). The sleeve 51b, which is such a movable part, is displaced slightly downward (by the dimension X) due to elastic deformation of a movable mechanism by a downward pressure applied from the large-diameter cylindrical portion 47 when performing the third step described below. In the case of this example, at a start stage of the third step described below, the holding surface 52a which is the upper end surface of the sleeve 51b is located above the lower end edge of the third normal rounding-chamfering surface 73 by an amount of the downward displacement amount (by the dimension X). Thereby, in a final stage of the third step described below, vertical positions of the holding surface 52a and the lower end edge of the third normal rounding-chamfering surface 73 coincides with each other.

In the case of this example, in a state where the sixth intermediate material 71 is set to such a mold device 72, the punch 28e is inserted into the center hole of the die 26d from above and pressed into an inner-diameter side of the large-diameter cylindrical portion 47. Thereby, the connection portion 48 is moved while being crushed from top to bottom (accordingly, while an inner-diameter portion of the large-diameter cylindrical portion 47 is handled from the top to the bottom), and is punched downward.

The radial outer end portion of the lower end surface of the large-diameter cylindrical portion 47 is pressed against the third preliminary rounding-chamfering surface 73 in the axial direction by the handling and the punching load at this time, so that a third normal chamfer portion 74 having a quarter-convex arc sectional shape is formed on the outer peripheral edge of the lower end portion of the large-diameter cylindrical portion 47. A radius of curvature of the sectional shape of the third normal rounding-chamfer portion 74 is $r_3$ as that of the third not mal rounding-chamfering surface 73. In the case of this example, the third normal rounding-chamfer portion 74 corresponds to a normal chamfer portion. In the case of this example, the large-diameter cylindrical ring member 20a obtained in this manner is subjected to post-processing such as cutting and grinding, so that the outer ring 2 (see FIG. 10) configuring the radial rolling bearing 1 is obtained.

As described above, in the case of this example, the third step as described above is performed in a state where the third preliminary rounding-chamfer portion 69 in which a width dimension $R_3$ thereof in the radial direction (and the axial direction) is larger than the width direction $r_3$ of the third normal rounding-chamfering surface 73 in the radial direction is formed on the outer peripheral edge of the lower end portion of the large-diameter cylindrical portion 47. That is, the radial outer end portion of the lower end surface of the large-diameter cylindrical portion 47 is pressed against the third normal rounding-chamfering surface 73, so that the third normal chamfer portion 74 is formed on the outer peripheral edge of the lower end portion of the large-diameter cylindrical portion 47.

Therefore, as in the conventional method described in the above-described Patent Document 1, it can be avoided that the sharp end edge is initially brought into contact with the chamfering surface (the third normal rounding-chamfering surface 73) with an arc sectional shape. As a result, when forming the third normal rounding-chamfer portion 74 by cold forging, a material of the sixth intermediate material 71 can smoothly flow on the inner peripheral edge of the lower end portion of the large-diameter cylindrical portion 47, and the shape accuracy of the third normal rounding-chamfer portion 74 formed on the outer peripheral edge of the lower end portion of the large-diameter cylindrical portion 47 can be improved.

In the case of the third step in the example, a radial outer end side portion (a portion slightly closer to the radial inner side than the radial outer end edge) of the holding surface 52a is initially brought into contact with a radial intermediate portion (a portion located on a radial inner side from the inner peripheral edge of the third preliminary rounding-chamfer portion 69) of the lower end surface of the large-diameter cylindrical portion 47. In this state, the third preliminary rounding-chamfer portion 69, which is a portion axially opposed to the third normal rounding-chamfering surface 73, of the lower end surface of the large-diameter cylindrical portion 47 is located above the virtual plane including the holding surface 52a. Therefore, in the case of this example, in the process in which the holding surface 52a is displaced downward based on the pressure applied from the large-diameter cylindrical portion 47 as the processing in the third step described above proceeds, a material of the outer peripheral edge (the portion where the third preliminary rounding-chamfer portion 69 is formed) of the lower end portion of the large-diameter cylindrical portion 47 may hardly flow downward from the virtual plane including the holding surface 52a. As a result, in the case of this example, a part of the material enters into a boundary between the holding surface 52a and the third normal rounding-chamfering surface 73 (between the outer peripheral surface of the sleeve 51b and the inner peripheral surface of the large-diameter cylindrical surface portion 30d of the die 26d), and it is possible to prevent the burr from being formed.

This application is based on a Japanese Patent Application No. 2016-141062 filed on Jul. 19, 2016, the contents of which is incorporated herein by reference.

INDUSTRIAL APPLICABILITY

The cylindrical ring member which is the object of the manufacturing method of the present invention is not limited to the material for constructing the inner ring and the outer ring configuring the radial ball bearing, but, for example, may be the material for constructing the inner ring and the outer ring configuring other type radial rolling bearings such as a radial cylindrical roller bearing and a radial tapered roller bearing, and various one-way clutches such as a radial rolling bearing, a roller clutch, a cam clutch, and the like.

That is, when manufacturing a bearing including an outer ring and an inner ring, the outer ring and/or the inner ring is manufactured by the method of manufacturing the cylindrical ring member described above.

When manufacturing a clutch including an outer ring and an inner ring, the outer ring and/or the inner ring is manufactured by the method of manufacturing the cylindrical ring member described above.

When manufacturing a vehicle including the bearing or the clutch, the bearing or the clutch is manufactured by the method of manufacturing the bearing or the clutch.

When manufacturing a machine including the bearing or the clutch, the bearing or the clutch is manufactured by the method of manufacturing the bearing or the clutch.

In performing the present invention, the normal chamfer portion and the preliminary chamfer portion are not limited to the rounding-chamfer portion, and it is also possible to make a C chamfer portion having a linear sectional shape or a chamfer portion having a compound curve sectional shape.

In the case where the normal chamfer portion and the preliminary chamfer portion are rounding-chamfer portions, the arc which is the sectional shape of the rounding-chamfer portion may be not necessarily a quarter arc.

DESCRIPTION OF REFERENCE NUMERALS

1: radial ball bearing, 2: outer ring, 3: inner ring, 4: ball, 5: outer ring raceway, 6: inner ring raceway, 7: retainer, 8: billet, 9: small-diameter portion, 10: large-diameter portion, 11: first intermediate material, 12: small-diameter cylindrical portion, 13: second intermediate material, 14: large-diameter cylindrical portion, 15: third intermediate material, 16: bottom plate portion, 17: fourth intermediate material, 18, 18a: small-diameter cylindrical ring member, 19: inward flange, 20, 20a: large-diameter cylindrical ring member, 21: first intermediate material, 22: second intermediate material, 23: third intermediate material, 24: fourth intermediate material, 25: mold device, 26, 26a, 26b, 26c, 26d: die (mold), 27, 27a: die pin, 28, 28a, 28b, 28c, 28d, 28e: punch (mold), 29, 29a, 29b, 29c, 29d: small-diameter cylindrical surface portion, 30, 30a, 30b, 30c, 30d: large-diameter cylindrical surface portion, 31, 31a, 31b: step portion, 32: first preliminary rounding-chamfering surface, 33: second preliminary rounding-chamfering surface, 34: small-diameter portion, 35: large-diameter portion, 36: first preliminary rounding-chamfer portion (preliminary chamfer portion), 37: second preliminary rounding-chamfer portion (preliminary chamfer portion), 38: mold device, 39: floating die, 40: counter punch, 41: small-diameter cylindrical surface portion, 42: large-diameter cylindrical surface portion, 43: step portion, 44: stopper, 45: elastic member, 46, 46a: small-diameter cylindrical portion, 47: large-diameter cylindrical portion, 48: connection portion, 49: bottom plate portion, 50: mold device, 51, 51a, 51b: sleeve (second mold), 52, 52a: holding surface, 53: small-diameter columnar portion, 54: large-diameter columnar portion, 55: first normal rounding-chamfering surface, 56: small-diameter columnar portion, 57: large-diameter columnar portion, 58: step portion, 59: pressing surface, 60: second normal rounding-chamfering surface (chamfering surface), 61: first normal rounding-chamfer portion (normal chamfer portion), 62: second normal rounding-chamfer portion (normal chamfer portion), 63: stepped surface, 64: burr, 65: mold device, 66: fourth normal rounding-chamfer portion, 67: fifth intermediate material, 68: mold device, 69: third normal rounding-chamfer portion, 70: third preliminary rounding-chamfering surface, 71: sixth intermediate material, 72: mold device, 73: third normal rounding-chamfering surface (chamfering surface), 74: third normal rounding-chamfer portion (normal chamfer portion), 75: chamfer portion

The invention claimed is:

1. A method of manufacturing a cylindrical ring member comprising:
   a step of forming a metal intermediate material having a cylindrical portion; and
   a chamfering step by cold forging in which a normal chamfer portion is formed on an axial end peripheral edge of the cylindrical portion by pressing a radial end portion of an axial end surface of the cylindrical portion against an annular chamfering surface provided in a mold configuring a mold device,
   wherein the chamfering step is performed by cold forging in a state where a preliminary chamfer portion, of which a width dimension in a radial direction is larger than a width dimension of the normal chamfer portion in the radial direction, is formed on the axial end peripheral edge of the cylindrical portion,
   wherein the mold device further includes a second mold having a ring-shaped holding surface arranged coaxially with the chamfering surface of the mold and adjacent to the chamfering surface of the mold in the radial direction,
   wherein the chamfering step by cold forging is performed by pressing the radial end portion of the axial end surface of the cylindrical portion in an axial direction against the chamfering surface, and pressing a portion, which is adjacent to the radial end portion in the radial direction, of the axial end surface of the cylindrical portion in the axial direction against the holding surface, and
   wherein when performing the chamfering step by cold forging, the holding surface is initially brought into contact with a radial intermediate portion of the axial end surface of the cylindrical portion.

2. The method of manufacturing the cylindrical ring member according to claim 1,
   wherein when performing the chamfering step by cold forging, the holding surface is initially brought into contact with the radial intermediate portion of the axial end surface of the cylindrical portion by arranging the holding surface closer to the axial end surface of the cylindrical portion in the axial direction than the chamfering surface of the mold.

3. The method of manufacturing the cylindrical ring member according to claim 2,
   wherein at a final stage of the chamfering step by cold forging, axial positions of the holding surface and an axial edge of the chamfering surface of the mold coincide with each other.

4. The method of manufacturing the cylindrical ring member according to claim 1,
   wherein processing for forming the preliminary chamfer portion and the preliminary chamfer portion is formed during the forming of the intermediate material by cold forging.

5. A method of manufacturing a bearing comprising an outer ring and an inner ring,
   wherein the outer ring and/or the inner ring are/is manufactured by the method of manufacturing the cylindrical ring member according to claim 1.

6. A method of manufacturing a clutch comprising an outer ring and an inner ring,
   wherein the outer ring and/or the inner ring are/is manufactured by the method of manufacturing the cylindrical ring member according to claim 1.

7. A method of manufacturing a vehicle comprising a bearing,
   wherein the bearing is manufactured by the method of manufacturing the bearing according to claim 5.

8. A method of manufacturing a vehicle comprising a clutch,
   wherein the clutch is manufactured by the method of manufacturing the clutch according to claim 6.

9. A method of manufacturing a machine comprising a bearing,
   wherein the bearing is manufactured by the method of manufacturing the bearing according to claim 5.

10. A method of manufacturing a machine comprising a clutch,
    wherein the clutch is manufactured by the method of manufacturing the clutch according to claim 6.

* * * * *